(12) United States Patent
Peng et al.

(10) Patent No.: US 12,406,417 B2
(45) Date of Patent: Sep. 2, 2025

(54) DATA PROCESSING METHOD, APPARATUS, AND DEVICE AND STORAGE MEDIUM

(71) Applicant: Tencent Technology (Shenzhen) Company Limited, Shenzhen (CN)

(72) Inventors: Mengqi Peng, Shenzhen (CN); Shuhuai Huang, Shenzhen (CN); Kaimo Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 294 days.

(21) Appl. No.: 18/201,640

(22) Filed: May 24, 2023

(65) Prior Publication Data

US 2023/0298237 A1  Sep. 21, 2023

Related U.S. Application Data

(63) Continuation of application No. PCT/CN2022/133999, filed on Nov. 24, 2022.

(30) Foreign Application Priority Data

Feb. 28, 2022 (CN) .......................... 202210184708.1

(51) Int. Cl.
*G06T 11/60* (2006.01)
*G06T 3/40* (2024.01)
*G06T 11/20* (2006.01)

(52) U.S. Cl.
CPC .............. *G06T 11/60* (2013.01); *G06T 3/40* (2013.01); *G06T 11/203* (2013.01)

(58) Field of Classification Search
None
See application file for complete search history.

(56) References Cited

U.S. PATENT DOCUMENTS

| | | |
|---|---|---|
| 7,444,603 B1 | 10/2008 | Kelly et al. |
| 2013/0033513 A1 | 2/2013 | Rasmusson et al. |

(Continued)

FOREIGN PATENT DOCUMENTS

| | | |
|---|---|---|
| CN | 111738935 A | 10/2020 |
| CN | 113791914 A | 12/2021 |

(Continued)

OTHER PUBLICATIONS

Domović et al.; "Algorithms for 2D Nesting Problem Based on the No-Fit Polygon;" MIPRO 2014, May 26-30, 2014, Opatija, Croatia (Year: 2014).*

(Continued)

*Primary Examiner* — Edward Martello
(74) *Attorney, Agent, or Firm* — Morgan, Lewis & Bockius LLP

(57) ABSTRACT

A data processing method performed by a computer device is disclosed. The method includes: obtaining N graphs, N being an integer greater than 2; determining a reference graph from the N graphs based on a graphic attribute of each graph; determining a placement rule corresponding to the N graphs according to a relationship between a graphic attribute of the reference graph and an attribute threshold; and placing the N graphs in a container according to the placement rule corresponding to the N graphs.

18 Claims, 10 Drawing Sheets

(56) References Cited

U.S. PATENT DOCUMENTS

2017/0243356 A1 8/2017 Eckert
2019/0279426 A1 9/2019 Musunuri et al.

FOREIGN PATENT DOCUMENTS

| CN | 113920184 A | 1/2022 |
| --- | --- | --- |
| CN | 114255160 A | 3/2022 |
| CN | 114708358 A | 5/2022 |
| WO | WO 2013091078 A1 | 6/2013 |
| WO | WO 2018044247 A1 | 3/2018 |

OTHER PUBLICATIONS

Benny K. Nielsen; "An efficient solution method for relaxed variants of the nesting problem;" Computing: The Australian Theory Symposium 2007 (CATS2007), Ballarat, Australia. Conferences in Research and Practice in Information Technology (CRPIT) vol. 65. (Year: 2007).*

Tencent Technology (Shenzhen) Company Limited, ISR, PCT/CN2022/133999, Jan. 16, 2023, 2 pgs.

* cited by examiner

Automatic 2UV expansion

Global parameter

| | |
|---|---|
| Coordinate system direction | z-axis upward |
| Light texture resolution (pixel) | 1024 |
| Number of pixels on edge of UV island | 4 |
| Main observation direction | z-axis upward |
| Lowest scene visibility | 0 |
| Scaling proportion of invisible region | 70% |
| Scaling proportion of complex light region | 151% |
| Defined as width (pixel) of elongated region | 1 |
| Elongated region processing mode | xxxxxx |
| Index number of output channel | 2 |

☐ Enable detection of complex light region nearby
☐ Enable detection of clear shadow region
☐ Box all selected models into the same UV space

Execution steps

Step 1: Cutting expansion
☐ Fewer cutting lines — Execute — Input: xxxx / Output: xxxx Step 2: Deformation straightening — Execute — Input: xxxx / Output: xxxx Step 3: Stretching boxing — Execute — Input: xxxx / Output: xxxx One-click execute

FIG. 1

DATA PROCESSING METHOD, APPARATUS, AND DEVICE AND STORAGE MEDIUM

CROSS-REFERENCE TO RELATED APPLICATIONS

This application is a continuation application of PCT Patent Application No. PCT/CN2022/133999, entitled "DATA PROCESSING METHOD AND APPARATUS, AND DEVICE AND STORAGE MEDIUM" filed on Nov. 24, 2022, which claims priority to Chinese Patent Application No. 202210184708.1, entitled "DATA PROCESSING METHOD, APPARATUS, AND DEVICE AND STORAGE MEDIUM" filed to the China National Intellectual Property Administration on Feb. 28, 2022, all of which is incorporated by reference in its entirety.

FIELD OF THE TECHNOLOGY

This application relates to the field of computer technologies, and in particular, to a data processing method, apparatus, and device and a storage medium.

BACKGROUND OF THE DISCLOSURE

Generalized boxing refers to: providing some to-be-placed polygons and a container with a certain size and shape, and placing the to-be-placed polygons in the container, while ensuring that the polygons do not overlap and have a stable spacing and that a container filling rate is extremely utilized. Currently common boxing methods include NFP-based and lowest center-of-gravity methods, specifically including: sequentially determining a plurality of candidate angles for each to-be-placed polygon, determining a plurality of candidate positions according to the candidate angles, and placing the corresponding polygons according to the candidate positions with maximum center-of-gravity. It is found in practical studies that the container filling rate is low after placement according to the boxing method. Therefore, how to realize boxing with a higher container filling rate is one of hot issues studied at present.

SUMMARY

An embodiment of this application provides a data processing method, apparatus, and device and a storage medium.

According to one aspect, this embodiment of this application provides a data processing method performed by a computer device includes:
  obtaining N graphs, N being an integer greater than 2;
  determining a reference graph from the N graphs based on a graphic attribute of each graph;
  determining a placement rule corresponding to the N graphs according to a relationship between a graphic attribute of the reference graph and an attribute threshold; and
  placing the N graphs in a container according to the placement rule corresponding to the N graphs.

According to one aspect, this embodiment of this application provides a computer device, including: a processor, adapted to implement one or more computer-readable instructions; and a computer storage medium, the computer storage medium storing one or more computer-readable instructions, the one or more computer-readable instructions being loaded and executed by the processor and causing the computer device to:
  obtain N graphs, N being an integer greater than 2;
  determine a reference graph from the N graphs based on a graphic attribute of each graph;
  determine a placement rule corresponding to the N graphs according to a relationship between a graphic attribute of the reference graph and an attribute threshold; and
  place the N graphs in a container according to the placement rule corresponding to the N graphs.

According to one aspect, this embodiment of this application provides a non-transitory computer storage medium. The computer storage medium stores one or more computer-readable instructions. The computer-readable instructions, when executed by a processor of a computer device, causes the computer device to:
  obtain N graphs, N being an integer greater than 2;
  determine a reference graph from the N graphs based on a graphic attribute of each graph;
  determine a placement rule corresponding to the N graphs according to a relationship between a graphic attribute of the reference graph and an attribute threshold; and
  place the N graphs in the container according to the placement rule corresponding to the N graphs.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

FIG. 1 is a schematic diagram of a setting window in automatic 2uv expansion according to an embodiment of this application.

DESCRIPTION OF EMBODIMENTS

Figure 2:
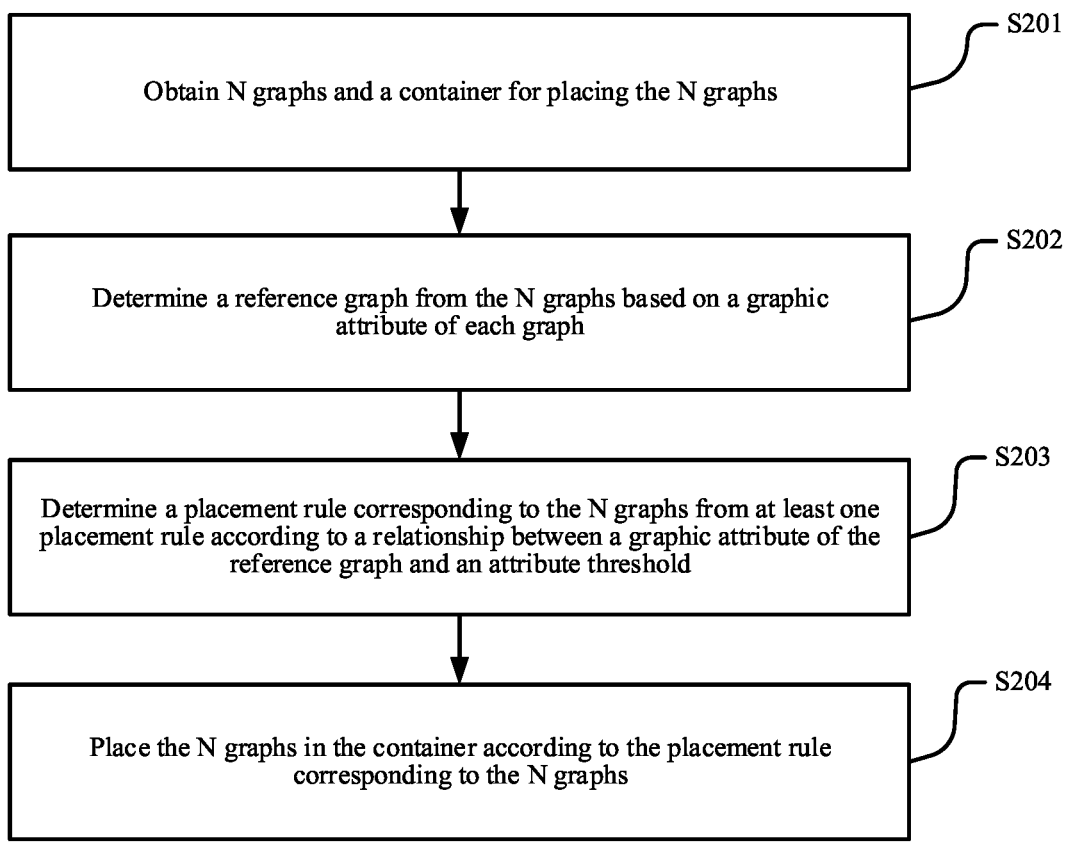
FIG. 2 is a schematic flowchart of a data processing method according to an embodiment of this application.

Technical solutions in the embodiments of this application are described below with reference to the accompanying drawings in the embodiments of this application.

This application provides a data processing scheme for solving the problem of graph boxing (placing graphs in a container). In specific implementations, according to a reference graph in N to-be-placed graphs, a suitable placement rule is determined for the N graphs, and then the N graphs are placed in a container according to the determined placement rule, thereby realizing targeted provision of the placement rule for the N graphs. Compared with placement of any graph in the container using a unified placement rule, placement of the N graphs using the targeted placement rule can improve a container filling rate.

The data processing scheme may be performed by a data processing device. The data processing device may be a terminal device such as a smartphone, a tablet computer, a laptop computer, a desktop computer, a smart voice interaction device, a smart appliance, a smartwatch, a vehicle-mounted terminal, or an aircraft. Alternatively, the data processing device may also be a server such as an independent physical server, a server cluster or distributed system composed of a plurality of physical servers, and a cloud server providing cloud computing services.

The data processing scheme provided by this embodiment of this application may be applied in automatic light texture mapping (2UV or Light Mapping) expanded item, automatic 2UV is a game art resource automated production tool for replacing a 2UV manual manufacture process of a scene model in a game item.

Automatic 2UV expansion is to expand a three-dimensional model in a two-dimensional manner. The three-dimensional model may be a three-dimensional model in any scene, such as a game prop in a game scene, or a game character. For another example, the three-dimensional model may be any virtual item in a virtual space scene, such as a cup or a chair. In order to make the three-dimensional model more realistic, it is often necessary to add some texture details to the three-dimensional model. But since the three-dimensional model is three-dimensional and textures for characterizing the texture details are two-dimensional, 3D meshes in the three-dimensional model need to be transferred to a 2D space in order to add textures to the three-dimensional model, the process is referred to as UV mapping.

In the 2D space, texture mapping (also referred to as texture mapping 1 UV) and light texture mapping (also referred to as 2UV/Light Mapping) are commonly used when making textures. The texture mapping is the process of mapping texture pixels in a texture space to pixels in the 2D space. 2UV is a general term of light textures and UV mapping. The light textures (also referred to as light maps) are light intensity data of a three-dimensional engine that contains light information. The light maps are precomputed for static targets, and the amount of computation is less than real-time lighting computation.

After transferring the 3D meshes in the three-dimensional model to the 2D space, closed and independent polygons formed in UV coordinates in the 2D space may be referred to as UV islands. Automatic 2UV may include three main steps of cutting expansion, horizontal and vertical operations, and compact boxing. FIG. 1 shows a setting window in automatic 2UV expansion according to an embodiment of this application. The setting window may include global parameters required for automatic 2UV expansion as shown in a region 101 of FIG. 1, such as coordinate system direction, light texture resolution, and number of pixels on an edge of a UV island. Each parameter may correspond to a setting option, and the corresponding parameter may be set by triggering any setting option. For example, the parameter of coordinate system direction corresponds to a setting option 110, and the coordinate system direction may be set by triggering the setting option 110. It is assumed that the coordinate system direction is z-axis upward in FIG. 1. For example, the setting option corresponding to the parameter of light texture resolution is 111, and the light texture resolution may be set by triggering the setting option 111. The light texture resolution is set to 1024 in this embodiment of this application.

The setting window in automatic 2UV expansion may also include execution steps of automatic 2UV expansion, as shown in a region 102 of FIG. 1. Each execution step may set corresponding input and output names, and a corresponding execution rule may be set for each execution step. For example, for the execution step of cutting expansion, the set execution rule may be fewer cutting lines. For the step of compact boxing, the data processing scheme in this embodiment of this application may be imported to achieve compact boxing in the case of a high filling rate.

Each execution step may be executed separately. For example, each execution step corresponds to an "execute" button. By triggering an execute button, the execution step corresponding to the execute button will be executed. Alternatively, the above three steps may be initiated and executed at the same time, and the three steps are executed sequentially in the order shown in FIG. 1. For example, the setting window includes a "one-click execute" button. By triggering the "one-click execute" button, the three steps may be initiated at the same time, whereby the three steps are executed sequentially.

In the third step, the data processing scheme provided in this embodiment of this application is adopted. In automatic 2UV expansion, N to-be-placed graphs refer to N UV islands. A reference UV island is determined from the N UV islands based on a graphic attribute of each UV island. Then a placement rule applicable to the N UV islands is determined from at least one placement rule according to a relationship between a graphic attribute of the reference UV island and an attribute threshold, and the N UV islands are placed in a container according to the determined placement rule. By using the data processing scheme provided in this application, targeted boxing of a plurality of UV islands can be realized, thereby improving a container filling rate.

Based on the foregoing data processing scheme, this embodiment of this application provides a data processing method. FIG. 2 is a schematic flowchart of a data processing method according to an embodiment of this application. The data processing method in FIG. 2 may be performed by a data processing device, and may specifically be performed by a processor of the data processing device. The data processing method in FIG. 2 may include the following steps:

Step S201: Obtain N graphs and a container for placing the N graphs.

Figure 3A:
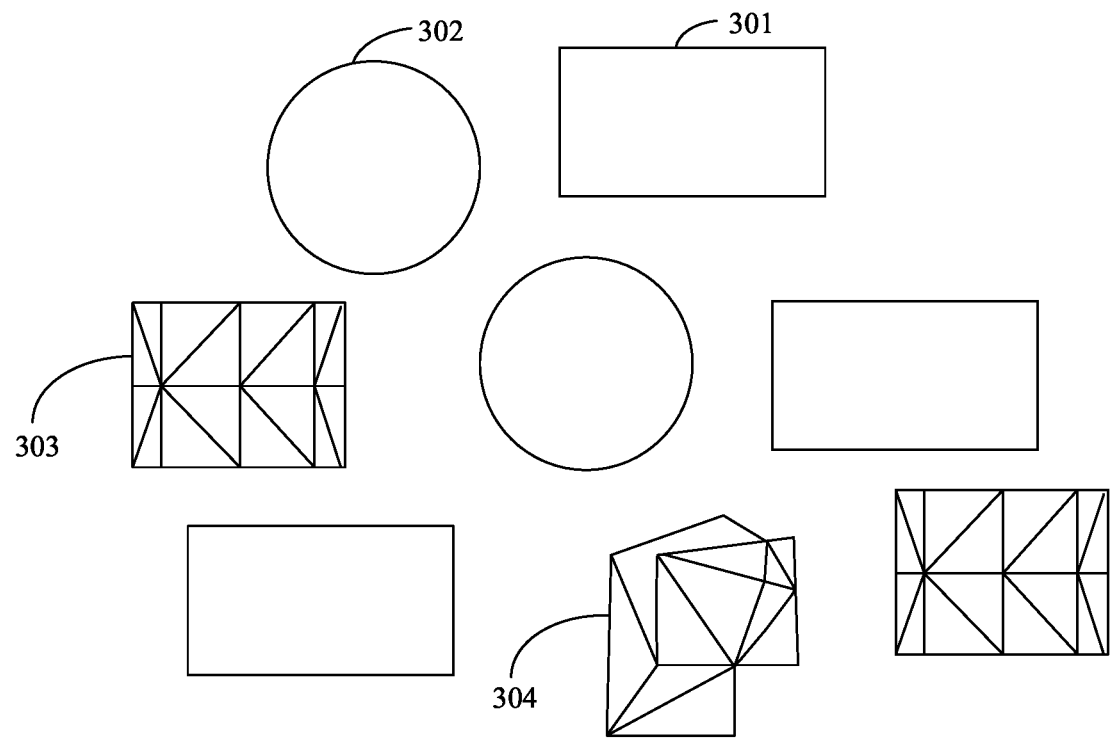
FIG. 3a is a schematic diagram of N graphs according to an embodiment of this application.

The N graphs may be graphs of any shape. For example, the N graphs may be polygons of a regular shape, such as rectangles, triangles, or circles. For example, the N graphs may also be polygons of an irregular shape. Each graph in the N graphs may be an independent polygon, or a graph spliced from a plurality of polygons. The N graphs may include some identical graphs. FIG. 3a is a schematic diagram of N graphs according to an embodiment of this application. N graphs shown in FIG. 3a may include independent polygons 301 and 302 of a regular shape, and may also include spliced polygons 303 and 304 of an irregular shape. The N graphs may include some identical graphs such as three polygons 301, two polygons 302, and two polygons 303.

Figure 3B:
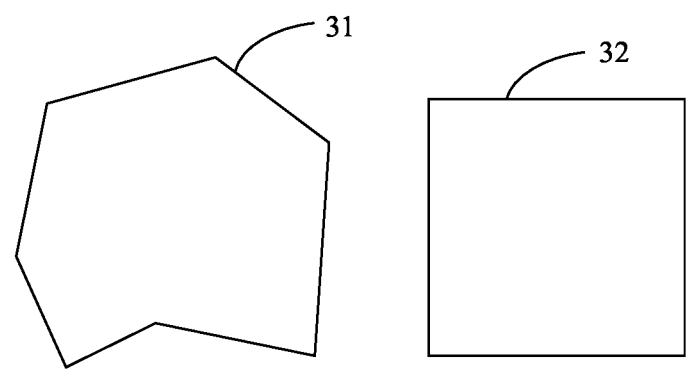
FIG. 3b is a schematic diagram of a container according to an embodiment of this application.

A container for placing the N graphs refers to a graph capable of placing other graphs therein. The container may be a graph of a regular shape or a graph of an irregular shape. FIG. 3b is a schematic diagram of a container according to an embodiment of this application. 31 represents a container of an irregular shape, and 32 represents a container of a regular shape.

In one embodiment, the N graphs and the container for placing the N graphs may be stored in a local storage of a data processing device. When it is necessary to place the N graphs in the container, the data processing device loads the N graphs and the container from the local storage.

In other embodiments, the N graphs and the container for placing the N graphs may be stored in other devices. When it is necessary for the data processing device to place the N graphs in the container, the data processing device receives the N graphs and the container for placing the N graphs, which are transmitted by the other devices, through interaction with the other devices.

Step S202: Determine a reference graph from the N graphs based on a graphic attribute of each graph.

In one embodiment, the graphic attribute of each graph may include a graphic area. The operation of determining a reference graph from the N graphs based on a graphic attribute of each graph may refer to: determining the reference graph from the N graphs based on the graphic area of each graph. In specific implementations, a total area of the N graphs is determined based on the graphic area of each graph. An area difference between the graphic area of each graph and the total area is determined. A first graph in the N graphs is determined as the reference graph. The area difference between the graphic area of the first graph and the total area satisfies a first area difference threshold.

In short, the area difference between the graphic area of each graph and the total area of the N graphs is calculated, and a graph in which the area difference between the graphic area and the total area satisfies the first area difference threshold is determined as the reference graph in the N graphs. For example, the N graphs include graph 1 and graph 2. If the area difference between graph 1 and the total area satisfies the first area difference threshold, graph 1 is a reference graph. Similarly, if the area difference between graph 2 and the total area satisfies the first area difference threshold, graph 2 is also a reference graph. Thus, the N graphs include one or more reference graphs.

The area difference between the graphic area of each graph and the total area may be represented by a ratio. For example, the ratio between the graphic area of the first graph and the total area is the area difference between the graphic area of the first graph and the total area. The first area difference threshold is a preset ratio set in advance. The situation that the area difference between the graphic area of the first graph and the total area satisfies the first area difference threshold refers to that: a proportion between the graphic area of the first graph and the total area is greater than or equal to the preset ratio. The above-mentioned ratio may be represented by percentage. For example, the first area difference threshold may be 5%. If the ratio between the graphic area of the first graph in the N graphs and the total area of the N graphs is greater than 5%, the first graph is determined as the reference graph. In other words, a graph having the graphic area greater than 5% of the total area in the N graphs is determined as the reference graph. The first area difference threshold is used for determining the reference graph.

The area difference between the graphic area of the reference graph and the total area satisfies the first area difference threshold. The reference graph has a larger graphic area than other graphs in the N graphs, and has a greater influence on a container filling rate. A placement rule corresponding to the N graphs is determined according to a relationship between the graphic attribute of the reference graph and the attribute threshold, which helps to improve the reliability of the placement rule determined finally.

In another embodiment, the graphic attribute of each graph may further include a graphic long-side length of each graph. The operation of determining a reference graph from the N graphs based on a graphic attribute of each graph may refer to: determining the reference graph from the N graphs based on the graphic long-side length of each graph. In specific implementations, a plurality of candidate graphs are determined from the N graphs. determining a length difference between the graphic long-side length of each graph in the plurality of candidate graphs and a long-side length of the container; and determining a second graph in the plurality of candidate graphs as the reference graph, the length difference between the graphic long-side length of the second graph and the long-side length of the container satisfying a length difference threshold.

In some embodiments, the plurality of candidate graphs include N graphs. That is to say, the reference graph is selected from the N graphs according to the graphic long-side length of each graph.

In some embodiments, the plurality of candidate graphs may further include: remaining graphs other than the first graph in the N graphs. That is to say, if the reference graph has been selected from the N graphs according to the graphic area of each graph, some reference graphs may also be selected from remaining images other than the selected reference graph in the N graphs according to the graphic long-side length. In this way, in the N graphs, the length difference between the graphic long-side length and the long-side length of the container satisfies the length difference threshold. Alternatively, the graph in which the area difference between the graphic area and the total area satisfies the first area difference threshold may be selected as the reference graph.

The length difference between the graphic long-side length of each graph and the long-side length of the container may be represented by a ratio. For example, the ratio between the graphic long-side length of the second graph and the long-side length of the container is the length difference between the graphic long-side length of the second graph and the long-side length of the container. The length difference threshold is a preset ratio set in advance. The condition that the length difference between the graphic long-side length of the second graph and the long-side length of the container satisfies the length difference threshold refers to that: a proportion between the graphic long-side length of the second graph and the long-side length of the container is greater than or equal to the preset ratio. The above-mentioned ratio may be represented by percentage. For example, the length difference threshold may be 55%. If the ratio between the graphic long-side length of the second graph in the N graphs and the long-side length of the container is greater than 55%, the second graph is determined as the reference graph. In other words, a graph having the graphic long-side length greater than 55% of the long-side length of the container in the N graphs is determined as the reference graph.

The length difference between the graphic long-side length of the reference graph and the long-side length of the container satisfies the length difference threshold. The reference graph has a larger graphic long-side length than other graphs in the N graphs, and has a greater influence on a container filling rate. A placement rule corresponding to the N graphs is determined according to a relationship between the graphic attribute of the reference graph and the attribute threshold, which helps to improve the reliability of the placement rule determined finally.

Step S203: Determine a placement rule corresponding to the N graphs from at least one placement rule according to a relationship between a graphic attribute of the reference graph and an attribute threshold.

The at least one placement rule includes a global scaling placement rule and a mixed scaling placement rule. The operation of determining a placement rule corresponding to the N graphs from at least one placement rule according to a relationship between a graphic attribute of the reference graph and an attribute threshold may include: determining the mixed scaling placement rule as the placement rule corresponding to the N graphs in response to a first numerical relationship between the graphic attribute of the reference graph and the attribute threshold; and determining the global scaling placement rule as the placement rule corresponding to the N graphs in response to a second numerical relationship between the graphic attribute of the reference graph and the attribute threshold.

The graphic attribute of the reference graph mentioned here refers to a graphic area attribute of the reference graph. In the presence of a plurality of reference graphs, the graphic area attributes of the reference graphs are the result of adding the graphic areas of the plurality of reference graphs. In some embodiments, the attribute threshold may be determined based on the total area of the N graphs and a second area difference threshold. Specifically, the total area of the graphs and the second area difference threshold may be multiplied to obtain a result serving as the attribute threshold. The second area difference threshold is a preset ratio set in advance, which may be represented by percentage. For example, the second area difference threshold may be 55%. In some embodiments, the attribute threshold may also be a value that is pre-executed based on experience. The second area difference threshold is used for determining the attribute threshold.

The first numerical relationship between the graphic attribute of the reference graph and the attribute threshold refers to that: the graphic area of the reference graph is greater than the attribute threshold. The second numerical relationship between the graphic attribute of the reference graph and the attribute threshold refers to that: the graphic area of the reference graph is less than or equal to the attribute threshold.

Step S204: Place the N graphs in the container according to the placement rule corresponding to the N graphs.

In one embodiment, in response to the placement rule corresponding to the N graphs being a mixed scaling placement rule and the mixed scaling placement rule including an independent scaling placement rule and a global scaling placement rule, the operation of placing the N graphs in the container according to the placement rule corresponding to the N graphs may refer to: performing independent scaling placement on the reference graph according to the independent scaling placement rule, and placing the reference graph in the container according to an independent scaling placement result; and performing global scaling placement on remaining graphs other than the reference graph in the N graphs according to the global scaling placement rule, and placing the remaining graphs in the container according to a global scaling placement result.

In short, if it is determined, based on the relationship between the graphic attribute of the reference graph and the attribute threshold, that the placement rule corresponding to the N graphs is a mixed placement rule, the operation of placing the N graphs in the container according to the mixed placement rule refers to: processing the reference graph and remaining graphs other than the reference graph in the N graphs according to difference placement rules in the mixed placement rule, respectively.

In another embodiment, in response to the placement rule corresponding to the N graphs being a global scaling placement rule, the operation of placing the N graphs in the container according to the placement rule corresponding to the N graphs refers to: performing global scaling placement on each graph in the N graphs according to the global scaling placement rule, and placing each graph in the N graphs in the container according to a global scaling placement result. That is to say, if it is determined, based on the relationship between the graphic attribute of the reference graph and the attribute threshold, that the placement rule corresponding to the N graphs is a global scaling placement rule, all the graphs in the N graphs are processed according to the global scaling placement rule to place the N graphs in the container.

As can be seen from the above two embodiments, in the case of different relationships between the graphic attribute of the reference graph and the attribute threshold, the N graphs are placed in the container using different placement rules. This is because if there is a first numerical relationship between the graphic attribute of the reference graph and the attribute threshold, the reference graph has a larger graphic area or a larger graphic long-side length than other graphs in the N graphs, and there will be certain restrictions on a global scaling proportion when scaling globally. That is to say, it cannot be scaled to a small size. If the reference graph and other graphs are subjected together to global scaling placement without considering this, the overall global scaling proportion will be affected, thereby affecting the container filling rate.

Figure 4A:
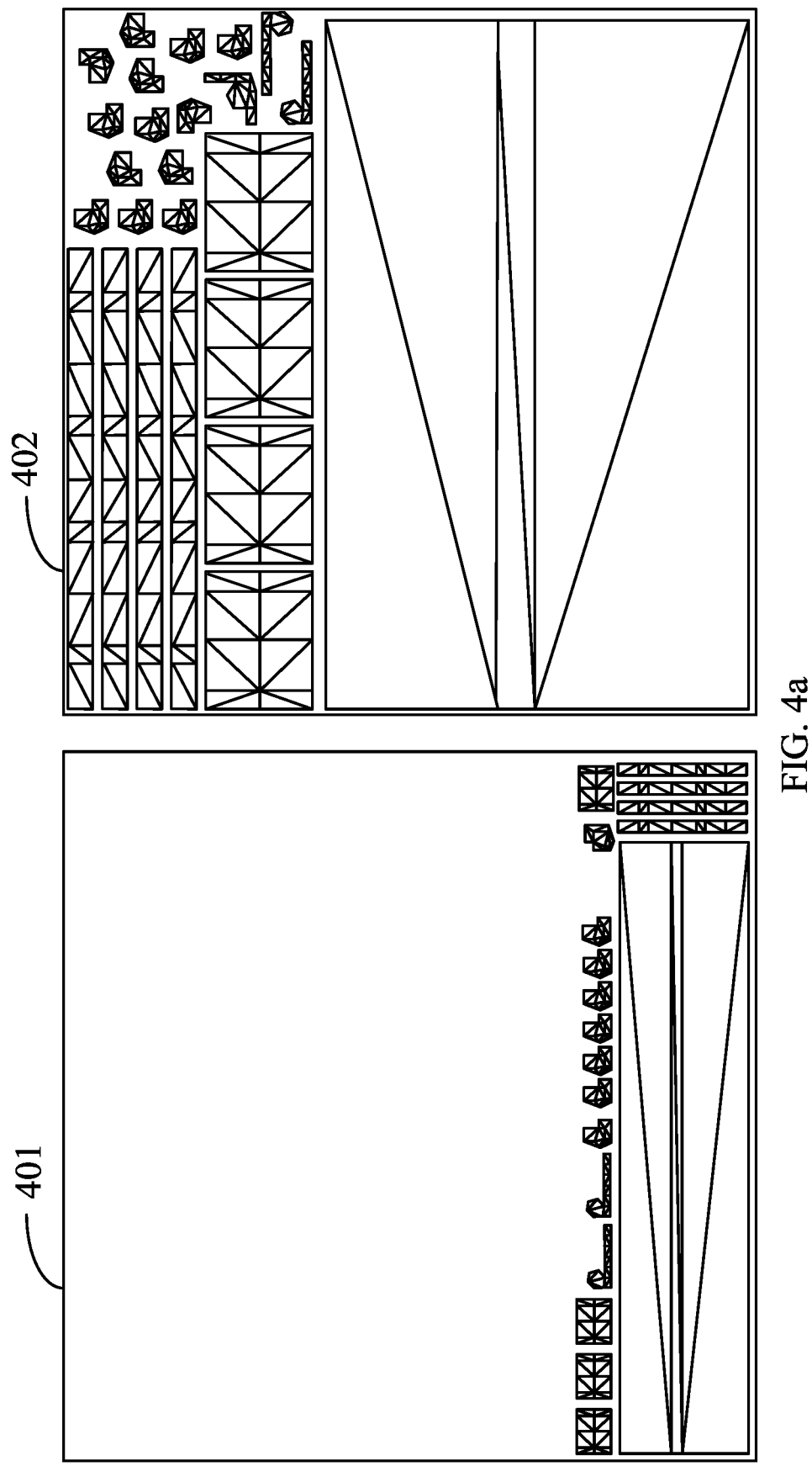
FIG. 4a is a schematic diagram of placement of N graphs in a container according to an embodiment of this application.
Figure 4B:
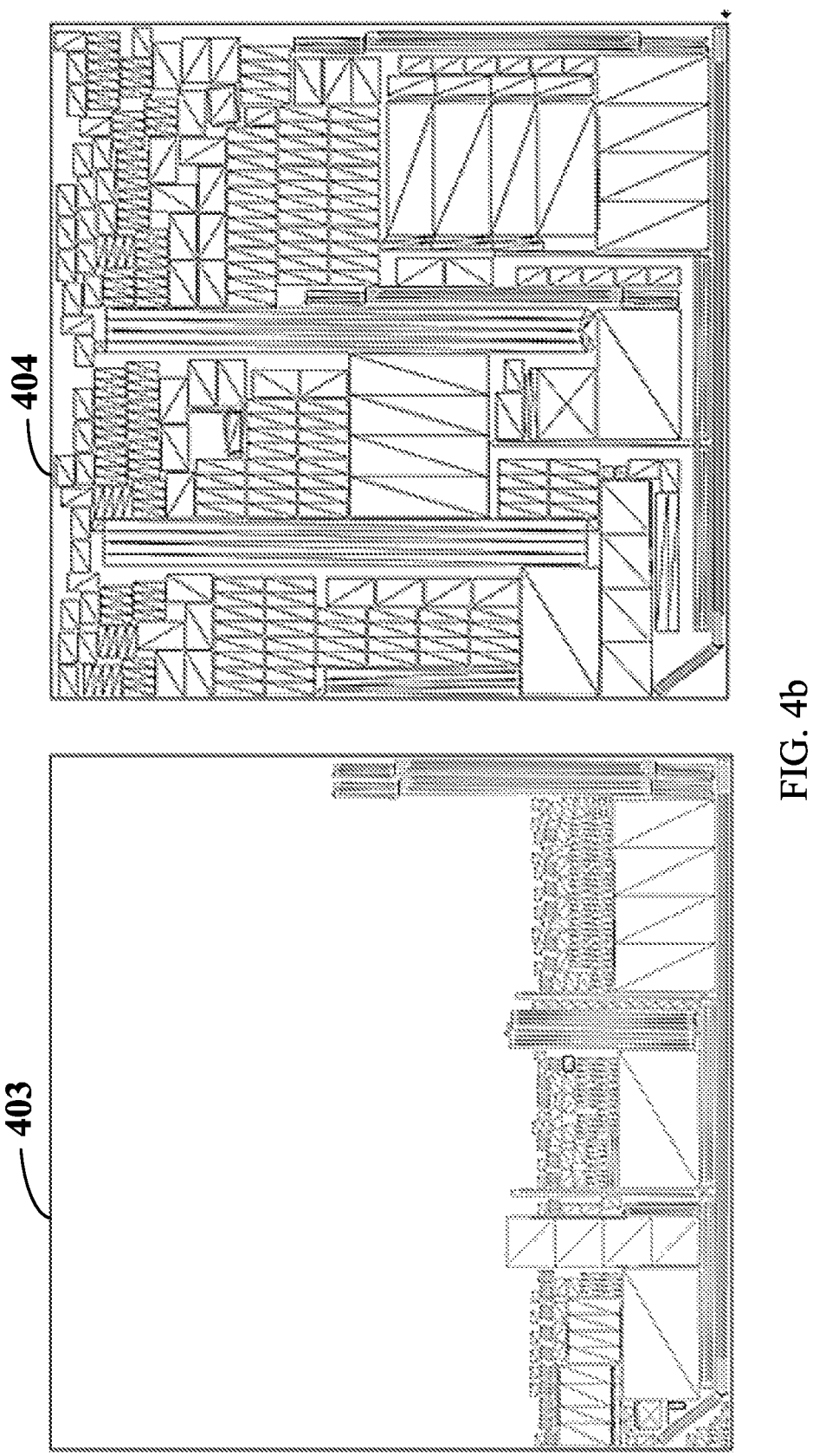
FIG. 4b is another schematic diagram of placement of N graphs in a container according to an embodiment of this application.

In the presence of the second numerical relationship between the graphic attribute of the reference graph and the attribute threshold, there is no big difference between the graphic attributes of the reference graph and other graphs in the N graphs, and the N graphs may be subjected to global scaling placement together. The following visually compares through graphs. It is assumed that the graphic area attribute of the reference graph in the N graphs is greater than the attribute threshold. FIG. 4a is a schematic diagram of placement of N graphs in a container according to an embodiment of this application. FIG. 4b is another schematic diagram of placement of N graphs in a container according to an embodiment of this application. 401 represents a placement result of placing each graph in the N graph in the container after performing global scaling placement according to the global scaling placement rule, and 404 represents a placement result of placing the N graphs in the container using the mixed scaling placement rule. The N graphs in 401 and 402 are identical, and the N graphs in 403 and 404 are identical.

As can be seen from the comparison between 401 and 402 and the comparison between 403 and 404, the N graphs are placed in the container using the mixed scaling placement rule when the graphic data of the reference graph is greater than the attribute threshold. A higher container filling rate is achieved compared with placement of the N graphs in the container according to the global scaling placement rule.

In this embodiment of this application, for different relationships between the graphic attribute of the reference graph and the attribute threshold, the N graphs are placed according to different placement rules and the N graphs are placed in the container, thereby realizing targeted boxing. The N graphs are boxed using a suitable placement rule. In this way, the container filling rate can be improved to some extent.

Figure 5:
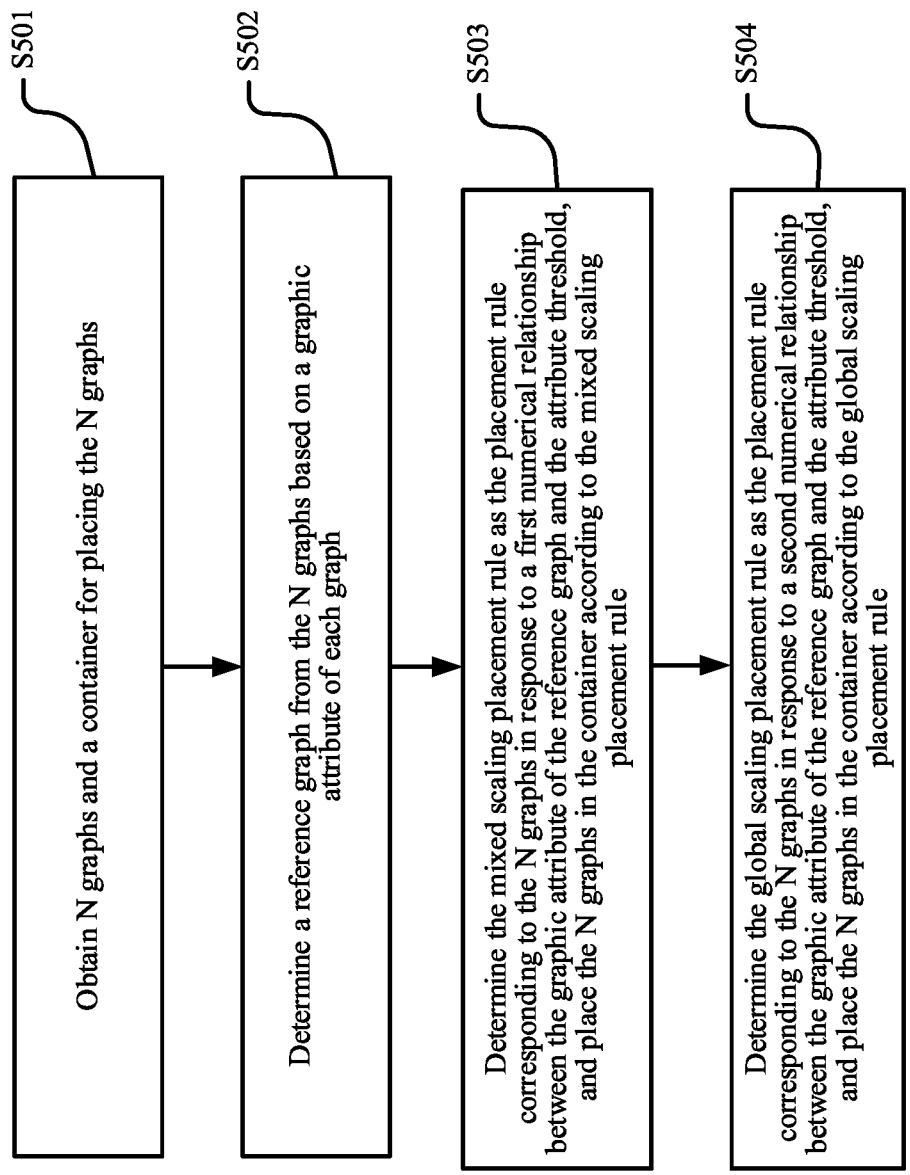
FIG. 5 is a schematic flowchart of another data processing method according to an embodiment of this application.

Based on the foregoing data processing method, this embodiment of this application provides another data processing method. FIG. 5 is a schematic flowchart of another data processing method according to an embodiment of this application. The data processing method in FIG. 5 may be performed by a data processing device, and may specifically be performed by a processor of the data processing device. The data processing method in FIG. 5 may include the following steps:

Step S501: Obtain N graphs and a container for placing the N graphs.

Step S502: Determine a reference graph from the N graphs based on a graphic attribute of each graph.

In one embodiment, some feasible implementations included in step S501 and step S502 may be described with reference to step S201 and step S202 in the embodiment of FIG. 2, and will not be described in detail herein.

Step S503: Determine the mixed scaling placement rule as the placement rule corresponding to the N graphs in response to a first numerical relationship between the graphic attribute of the reference graph and the attribute threshold, and place the N graphs in the container according to the mixed scaling placement rule.

As can be seen from the foregoing, the operation of placing the N graphs in the container according to the mixed scaling placement rule refers to: performing independent scaling placement on the reference graph in the N graphs according to the independent scaling placement rule, and placing the reference graph in the container according to an independent scaling placement result; and performing global scaling placement on remaining graphs other than the reference graph in the N graphs according to the global scaling placement rule, and placing the remaining graphs in the container according to a global scaling placement result.

Step S504: Determine the global scaling placement rule as the placement rule corresponding to the N graphs in response to a second numerical relationship between the graphic attribute of the reference graph and the attribute threshold, and place the N graphs in the container according to the global scaling placement rule.

The operation of placing the N graphs in the container according to the global scaling placement rule refers to: performing global scaling placement on each graph in the N graphs according to the global scaling placement rule, and placing each graph in the N graphs in the container according to a global scaling placement result.

The process of independent scaling placement and the process of global scaling placement are introduced below respectively. The number of independent scaling placements is i, i being a positive integer. The process of performing independent scaling placement on the reference graph according to the independent scaling placement rule includes:

1) enabling i=1, and determining an independent scaling proportion corresponding to an $i^{th}$ independent scaling placement;
2) independently scaling the reference graph according to the independent scaling proportion corresponding to the $i^{th}$ independent scaling placement;
3) placing the independently scaled reference graph to obtain a first placement result indicating that the independently scaled reference graph is placed in the container;
4) determining a container filling rate corresponding to the first placement result; and
5) enabling i=i+1 in response to i being less than a first preset value, and cyclically performing the process of the $i^{th}$ independent scaling placement until i is greater than or equal to the first preset value. The first preset value is a preset upper limit of attempts for the independent scaling proportion.

The global scaling placement is involved in step S503 and step S504 but for different objects, and the process of the global scaling placement is the same. Therefore, for the convenience of description, a graph required for global scaling placement in the N graphs is added to the first to-be-placed graph set. In other words, the graphs in the first to-be-placed graph set are objects subjected to global scaling placement. In step S503, the first to-be-placed graph set includes remaining graphs other than the reference graph in the N graphs. In step S504, the first to-be-placed graph set includes N graphs. The number of global scaling placements is r, r being a positive integer. The process of global scaling placement includes:

1) enabling r=1, and determining a global scaling proportion corresponding to an $r^{th}$ global scaling placement;
2) globally scaling each graph in the first to-be-placed graph set according to the global scaling proportion corresponding to the $r^{th}$ global scaling placement;
3) placing each globally scaled graph to obtain a second placement result indicating that the first to-be-placed graph set is placed in the container;
4) determining a container filling rate corresponding to the second placement result; and
5) enabling r=r+1 in response to r being less than a second preset value, and cyclically performing the process of the $r^{th}$ global scaling placement until r is greater than or equal to the second preset value. The second preset value is a preset upper limit of attempts for the global scaling proportion.

As can be seen from the description in step S503, after independent scaling placement is performed on the reference graph, the reference graph is placed in the container according to an independent scaling placement result. In specific implementations, a first container filling rate is determined from container filling rates corresponding to first placement results determined in all cycles, and an independent scaling proportion when the first container filling rate is obtained is obtained. The reference graph is scaled according to the obtained independent scaling proportion, and the scaled reference graph is placed in the container according to the first placement result corresponding to the first container filling rate. The first container filling rate may be a maximum container filling rate in the container filling rates determined in all cycles. In this way, the reference graph is placed in the container according to the first placement result corresponding to the first container filling rate, thereby ensuring that the container filling rate of the container is the best.

In step S503, the reference graph and the remaining graphs other than the reference graph in the N graphs are subjected to scaling placement respectively and then placed in the container. How to place the reference graph in the container has been described above, and how to place the remaining graphs other than the reference graph in the N graphs in the container will be described below. Specifically, after performing global scaling placement on the remaining graphs according to the foregoing process of global scaling placement, a global scaling placement result is obtained, and then the remaining graphs are placed in the container according to the global scaling placement result. In some embodiments, the operation of placing the remaining graphs in the container according to a global scaling placement result may include: determining a second container filling rate from container filling rates corresponding to second placement results determined in all cycles in the process of global scaling placement, and obtaining a global scaling proportion when the second container filling rate is obtained; and scaling the remaining graphs according to the obtained global scaling proportion, and placing the scaled remaining graphs in the container according to the second placement result corresponding to the second container filling rate. The second container filling rate may be a maximum container filling rate in the container filling rates corresponding to the second placement results determined in all cycles. The remaining graphs are placed in the container according to the global scaling proportion corresponding to the maximum container filling rate, thereby ensuring the best container filling rate.

In step S504, each graph in the N graphs is placed in the container according to the global scaling placement rule. That is, global scaling placement is performed on each graph in the N graphs, and then each graph is placed in the container according to the global scaling placement result. The process of performing global scaling placement on each graph in the N graphs may be described as above. The operation of placing each graph in the container according to a global scaling placement result may include: determining a second container filling rate from container filling rates corresponding to second placement results determined in all cycles in the process of global scaling placement, and obtaining a global scaling proportion when the second container filling rate is obtained; and scaling each graph in the N graphs according to the obtained global scaling proportion, and placing each scaled graph in the container according to the second placement result corresponding to the second container filling rate.

Thus, each graph in the N graphs can be placed in the container in a suitable manner through step S503 and step S504, so as to ensure the best container filling rate.

In the foregoing processes of independent scaling placement and global scaling placement, a certain graph is placed in each cycle to obtain a placement result. For example, in the process of independent scaling placement, the independently scaled reference graph needs to be placed in each cycle to obtain a first placement result. In the process of global scaling placement, each globally scaled graph in the first to-be-placed graph set needs to be placed in each cycle to obtain a second placement result of the first to-be-placed graph set. The placement processes for the independently scaled reference graph and the globally scaled graph in the first to-be-placed graph set are the same. Therefore, in order to introduce the placement process below, a graph to be placed is added to a second to-be-placed graph set. The second to-be-placed graph set may include independently scaled reference graphs in all independent scaling placement processes, or globally scaled graphs in the first to-be-placed graph set in all global scaling placement processes.

Therefore, the operation of placing the independently scaled reference graph to obtain a first placement result indicating that the independently scaled reference graph is placed in the container and placing each globally scaled graph in the first to-be-placed graph set to obtain a second placement result indicating that the first to-be-placed graph set is placed in the container refers to: placing the graphs in the second to-be-placed graph set to obtain a placement result indicating that the second to-be-placed graph set is placed in the container. In some embodiments, the operation of placing the graphs in the second to-be-placed graph set to obtain a placement result indicating that the second to-be-placed graph set is placed in the container includes: grouping the second to-be-placed graph set according to a graphic area of each graph in the second to-be-placed graph set to obtain P graph groups arranged sequentially, each graph group including one or more graphs belonging to the second to-be-placed graph set, the graphic area of each graph in the top-ranked graph groups being greater than the graphic area of each graph in the bottom-ranked graph groups, and the graphs in each graph group being ranked in descending order of the graphic area; placing each graph group to determine a placement result corresponding to each graph group; and combining the placement results corresponding to the graph groups into a placement result indicating that each graph in the second to-be-placed graph set is placed in the container.

It is assumed that the P graph groups include a graph group j and the graph group j includes Mj graphs. Taking the graph group j as an example, how to place each graph group to determine a placement result corresponding to each graph group will be introduced below. The operation of placing the graph group j to determine a placement result corresponding to the graph group j may include:

performing cross transformation on the graph group j to determine a population individual set corresponding to the graph group j, the population individual set including a plurality of candidate individuals, each candidate individual including Mj graphs arranged in an order, and the Mj graphs in the different candidate individuals being arranged in different orders; placing the Mj graphs according to the arrangement order of the Mj graphs in each candidate individual to obtain a placement result corresponding to each candidate individual; calculating an average placement center-of-gravity corresponding to each candidate individual according to the placement result corresponding to each candidate individual; and taking the placement result corresponding to the candidate individual with the average placement center-of-gravity satisfying a center-of-gravity condition as the placement result corresponding to the graph group j. The situation that the average placement center-of-gravity satisfies the center-of-gravity condition may refer to that: the average placement center-of-gravity is minimal in the average placement centers-of-gravity corresponding to all candidate individuals. In some embodiments, the cross transformation processing of the graph group j may be implemented based on a genetic algorithm. The genetic algorithm is a computational model that simulates the biological evolution process of natural selection and genetic mechanism of Darwin's theory of biological evolution, and is a method of searching for an optimal solution by simulating the natural evolution process. The algorithm uses computer simulation operations to convert the problem solving process into a process similar to the cross and variation of chromosome genes in biological evolution. When solving more complex combinatorial optimization problems, better optimization results can usually be obtained quickly compared with some conventional optimization algorithms.

In one embodiment, for any candidate individual, the data processing device may determine a placement result corresponding to any candidate individual using a boxing algorithm based on no fit polygon (NFP) and lowest center-of-gravity principle. NFP refers to a polygon formed by a trajectory of a reference point on a boundary when a polygon (referring to a graph in this application) along an internal boundary of another polygon (referring to a container in this application). In the boxing problem, NFP defines a feasible region when placing a polygon into the container. In specific implementations, the operation that the data processing device determines a placement result corresponding to any candidate individual using the boxing algorithm based on NFP and lowest center-of-gravity principle may include: sequentially taking out each graph from any candidate individual in the plurality of candidate individuals, and calculating a candidate placement angle of each graph; and determining a placement position of each graph in the container based on a lowest center-of-gravity principle and the candidate placement angle of each graph, and placing each graph in the container according to the determined placement position to obtain the placement result corresponding to the candidate individual.

In the related art, the boxing algorithm based on NFP and lowest center-of-gravity principle is also used for filling the N graphs into the container. However, practice has proved that although the boxing algorithm may obtain reasonable placement results, the boxing algorithm has a long calculation time and a low container filling rate. In addition, this application takes into account that in most scenes such as a game art production 2UV scene, graphs are allowed to be deformed, and the inputted graphs may be enlarged or reduced on the basis of satisfying an original relative proportion, so as to make the ultimate use of the space of the container. Therefore, a data processing method in FIG. 5 is provided. The data processing method in FIG. 5 is used for placing N graphs in a container to ensure a high container filling rate.

In one embodiment, in response to the N graphs including at least two identical symmetric graphs, the identical symmetric graphs are grouped in a same graph group, the identical symmetric graphs correspond to identical scaling proportions during scaling, and the identical symmetric graphs are gathered and placed during placement.

A symmetrical graph is an image that is symmetrical in shape, for example, an axisymmetric image or a center-symmetrical image. The same symmetrical graphs are graphs that are not only consistent in shape, but also symmetrical.

Figure 6A:
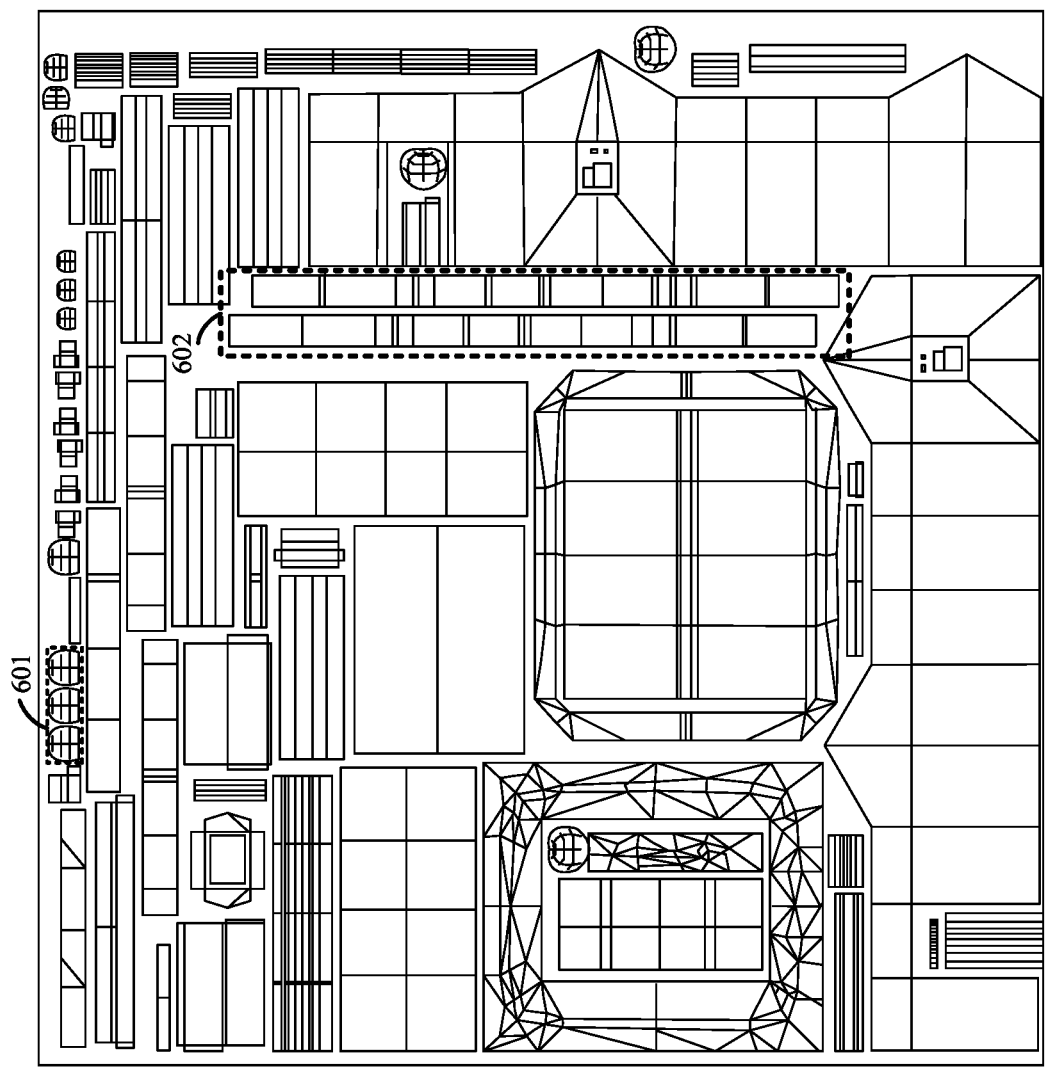
FIG. 6a is another schematic diagram of placement of N graphs in a container according to an embodiment of this application.
Figure 6B:
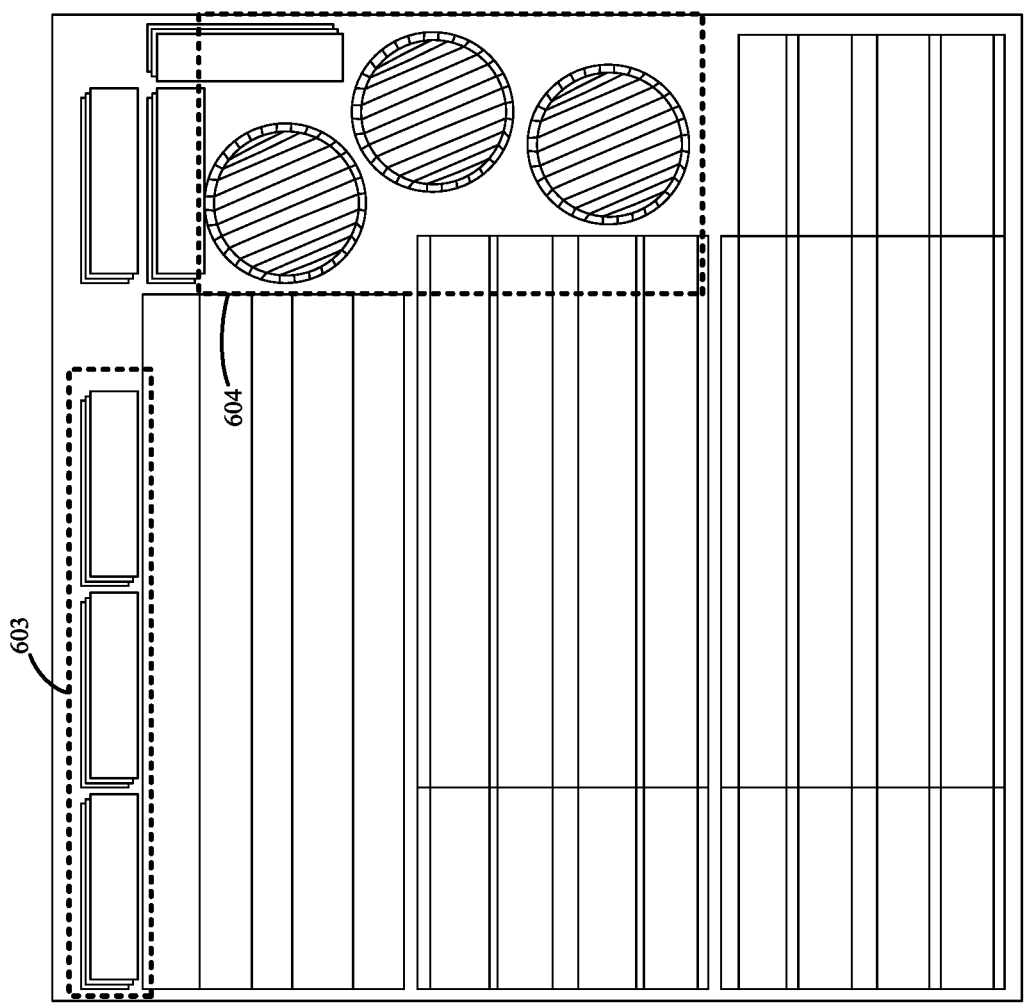
FIG. 6b is yet another schematic diagram of placement of N graphs in a container according to an embodiment of this application.

This application may add a symmetry retention policy whether it is in independent scaling placement or global scaling, whereby the originally symmetrical graphs adopt the same scaling proportion when scaling, thereby maintaining the relative size mode of the inputted graphs. With the addition of the symmetry retention policy, N graphs will be placed more neatly in the container, and the same symmetrical graphs will tend to converge together and maintain a consistent scaling proportion. FIG. 6a and FIG. 6b are two schematic diagrams of placement of N graphs in a container according to an embodiment of this application. In FIG. 6a, graphs in a region 601 are symmetrical, the graphs tend to converge together, and the graphs maintain the same scaling proportion. Similarly, graphs in a region 602 are symmetrical. In FIG. 6b, graphs in 603 are symmetrical to each other and graphs in 604 are symmetrical to each other. Since each graph group is placed separately, in order to place the same symmetrical graphs together and maintain a consistent scaling proportion, when grouping, the same symmetrical graphs may be divided into the same graph group, whereby the same symmetrical graphs may be placed in the same space region, so as to ensure a high container filling rate while ensuring the neatness of filling.

It is to be understood that the step of placing the graphs in the second to-be-placed graph set to obtain a placement result indicating that the second to-be-placed graph set is placed in the container will be performed repeatedly in either the process of independent scaling placement or the process of global scaling placement. In order to improve the final execution efficiency of placing the N graphs in the container, it is natural aware to improve the calculation efficiency of the step. In order to improve the calculation efficiency of the step, this application introduces the technique of snap rounding in robust geometric calculation when performing the step. In the study of robust geometric calculation, snap rounding may be classified as a finite precision approximation technology, which is a method for converting an arbitrary precision arrangement of line segments into a fixed-precision representation. The application of snap rounding in this application is mainly used for constraining the number of decimal places in vertex data of any graph. For example, when placing any graph in the container, it is calculated that vertex coordinates of any graph are n decimal places. The n decimal places need to consume more calculation time when calculating a placement position of any graph or other information. The snap rounding techniques are introduced to specify that the decimal places of the vertex coordinates are m, m is much less than n, and the calculation time can be saved. In order to satisfy that the snap-rounded graph does not overlap with other graphs in the process of placing graphs in the container, for any graph A1 required for snap rounding, a graph A2 obtained by snap rounding is required to be less than any graph A1. In order to satisfy the condition, before snap rounding, an additional half-pixel distance extension is required to obtain A3, and then A3 is subjected to snap rounding to obtain A2 with finite precision (namely, A1→A3→A2). The practice has proved that after using the finite precision approximation technique, the overall time of placing N graphs in the container can be saved by only 20%.

The data processing method in this embodiment of this application may be implemented based on software, such as integrating a boxing algorithm in a data processing device, and the data processing device executes the boxing algorithm to realize placement of N graphs in a container. The input of the boxing algorithm is N graphs and a container for placing N graphs. Before the boxing algorithm is executed, N to-be-placed graphs are first arranged in descending order of a graphic area. A graph having the graphic area greater than 5% of a total area of the N graphs or a long side of an oriented bounding box (long-side length of the graph) greater than 55% of a long-side length of the container is selected as a reference graph. The selected reference graph is also referred to as a big island. If a ratio of the graphic area of the selected reference graph to the total area of the N graphs is greater than 55%, independent scaling placement is performed on the reference graph and global scaling placement is performed on remaining graphs other than the reference graph. Otherwise, global scaling placement is performed on each graph in the N graphs.

The boxing algorithm may include three algorithm modules: a basic public algorithm module, an independent scaling algorithm module, and a global scaling algorithm module. The basic public algorithm module is shared by the independent scaling algorithm module and the global scaling algorithm module, and is designed based on the genetic algorithm, NFP and global lowest center-of-gravity principle.

The algorithm process of the basic public algorithm module is as follows.

1) To-be-placed scaled graphs (the to-be-placed scaled graphs include an independently scaled reference graph, N globally scaled graphs, and remaining graphs other than the reference graph in the N graphs, where the to-be-placed scaled graphs are equivalent to the above-mentioned second to-be-placed graph set) are arranged in descending order of a graphic area, the first m graphs are taken as basic individuals, and n candidate individuals of a population are generated according to basic operations such as cross, variation, and exchange of a genetic algorithm. Each candidate individual is a sequence composed of m graphs. In different candidate individuals, the m graphs are arranged in different orders. The n candidate individuals of the population may be represented as $[\{S_1\}, \{S_2\}, \ldots, \{S_n\}]$, where $S_i$ represents an $i^{th}$ candidate individual in the n candidate individuals, and i is greater than or equal to 1, and less than or equal to n.

2) A plurality of graphs in each candidate individual $S_i$ of the population are sequentially taken out based on NFP and lowest center-of-gravity principle, a candidate angle of each graph is calculated, a placement position of each graph is calculated according to NFP and the space of the container is updated until each graph in $S_i$ is placed in the container. If it is found that a valid placement result cannot be obtained according to the arrangement order of the graphs in the sequence, this candidate individual is skipped, and a next candidate individual $S_{i+1}$ is processed.

3) A plurality of valid placement results may be obtained by step 2), and a candidate individual with the lowest center-of-gravity is selected from the plurality of valid placement results as the best candidate individual of the population, namely the best boxing result for the m graphs. Then the remaining container space and to-be-boxed scaled graphs are updated. If there are scaled graphs that are not boxed, the process skips to step 1). Otherwise, the algorithm process of the basic public algorithm module is ended.

The valid placement result refers to that the graphs may be successfully placed in the container without overlapping each other.

The algorithm process of the independent scaling algorithm module is as follows.

1) It is assumed that the number of the selected reference graphs is w, represented as $\{B_1, B_2, \ldots B_w\}$, and an upper limit of attempts for an independent scaling proportion is set.

2) If the number of attempts for the independent scaling proportion reaches the upper limit, the process skips to step 5), otherwise a current independent scaling proportion combination is updated. The independent scaling proportion combination is obtained by combining the independent scaling proportions of the reference graphs together. The independent scaling proportion combination may be represented as $\{scale_1, scale_2, \ldots scale_w\}$.

3) The basic public algorithm module is used for the current independently scaled w reference graphs.

4) A container filling rate (equivalent to the above-mentioned container filling rate corresponding to the first placement result) corresponding to the current independent scaling proportion combination is calculated, a global optimal container filling rate is updated, and the process skips to step 2).

5) A placement result corresponding to the global optimal container filling rate is outputted (equivalent to the above-mentioned operation of obtaining a first container filling rate in the container filling rates corresponding to the first placement result and placing the reference graph according to the first placement result corresponding to the first container filling rate).

The algorithm process of the global scaling algorithm module is as follows.

1) If the independent scaling algorithm module has been executed, the remaining to-be-placed graphs are updated according to the placed reference graph, and the remaining graphs are taken as execution objects of the global scaling algorithm module. If the independent scaling algorithm module is not executed, the N to-be-placed graphs are taken as execution objects of the global scaling algorithm module. The remaining space of the container is updated, and an upper limit of attempts for a global scaling proportion is set.

2) If the number of attempts for the global scaling proportion reaches the upper limit, the process skips to step 5), otherwise a current global scaling proportion is updated as $scale_g$, and the execution objects are uniformly scaled according to the global scaling proportion.

3) The basic public algorithm module is used for the execution objects scaled according to $scale_g$.

4) A container filling rate corresponding to the current global scaling proportion is calculated, a global optimal container filling rate is updated, and the process skips to step 2).

5) A placement result corresponding to the global optimal container filling rate is outputted (equivalent to the above-mentioned operation of obtaining a second container filling rate in the container filling rates corresponding to the second placement result and placing the remaining graphs in the N graphs or the N graphs according to the second placement result corresponding to the second container filling rate).

In this embodiment of this application, the data processing device places the N graphs in the container using the boxing algorithm. For different relationships between the graphic attribute of the reference graph and the attribute threshold, the N graphs are placed according to different placement rules and the N graphs are placed in the container, thereby realizing targeted boxing. The N graphs are boxed using a suitable placement rule. In this way, the container filling rate can be improved to some extent.

Figure 7:
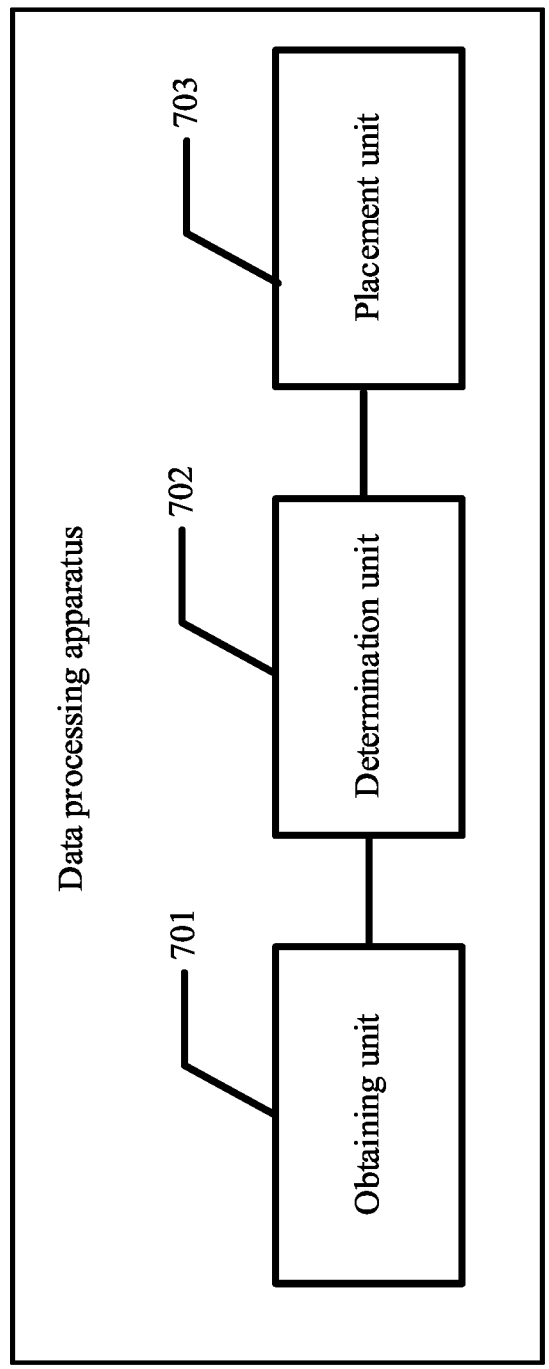
FIG. 7 is a schematic structural diagram of a data processing apparatus according to an embodiment of this application.

Based on the foregoing data processing method embodiment, this embodiment of this application provides a data processing apparatus. FIG. 7 is a schematic structural diagram of a data processing apparatus according to an embodiment of this application. The data processing apparatus in FIG. 7 may include the following units:

an obtaining unit 701, configured to obtain N graphs and a container for placing the N graphs, N being an integer greater than 2;

a determination unit 702, configured to determine a reference graph from the N graphs based on a graphic attribute of each graph;

the determination unit 702, further configured to determine a placement rule corresponding to the N graphs from at least one placement rule according to a relationship between a graphic attribute of the reference graph and an attribute threshold; and a placement unit 703, configured to place the N graphs in the container according to the placement rule corresponding to the N graphs.

In one embodiment, the at least one placement rule includes a mixed scaling placement rule and a global scaling placement rule. The determination unit 702, when determining a placement rule corresponding to the N graphs from at least one placement rule according to a relationship between a graphic attribute of the reference graph and an attribute threshold, performs the following steps:

determining the mixed scaling placement rule as the placement rule corresponding to the N graphs in response to a first numerical relationship between the graphic attribute of the reference graph and the attribute threshold; and determining the global scaling placement rule as the placement rule corresponding to the N graphs in response to a second numerical relationship between the graphic attribute of the reference graph and the attribute threshold.

In one embodiment, the graphic attribute of each graph includes a graphic area of each graph. The determination unit 702, when determining a reference graph from the N graphs based on a graphic attribute of each graph, performs the following steps:

determining a total area of the N graphs based on the graphic area of each graph;

determining an area difference between the graphic area of each graph and the total area; and determining a first graph in the N graphs as the reference graph, the area difference between the graphic area of the first graph and the total area satisfying a first area difference threshold.

In one embodiment, the graphic attribute of each graph includes a graphic long-side length of each graph. The determination unit 702, when determining a reference graph from the N graphs based on a graphic attribute of each graph, performs the following steps:

determining a plurality of candidate graphs from the N graphs, the plurality of candidate graphs including: N graphs; or, the plurality of candidate graphs including remaining graphs other than a first graph in the N graphs, the first graph referring to any graph in the N graphs in which an area difference between a graphic area of the graph and a total area of the N graphs satisfying a first area difference threshold;

determining a length difference between the graphic long-side length of each graph in the plurality of candidate graphs and a long-side length of the container; and determining a second graph in the plurality of candidate graphs as the reference graph, the length difference between the graphic long-side length of the second graph and the long-side length of the container satisfying a length difference threshold.

In one embodiment, the attribute threshold is determined based on the total area of the N graphs and a second area difference threshold. The determination unit 702 is further configured to:

determine a first numerical relationship between the graphic attribute of the reference graph and the attribute threshold in response to the graphic area of the reference graph being greater than the attribute threshold; and determine a second numerical relationship between the graphic attribute of the reference graph and the attribute threshold in response to the graphic area of the reference graph being less than or equal to the attribute threshold.

In one embodiment, in response to the at least one placement rule including a mixed scaling placement rule, remaining graphs other than the reference graph in the N graphs are required to be processed by global scaling placement. In response to the at least one placement rule including a global scaling placement rule, the N graphs are required to be processed by global scaling placement. The graphs required to be processed by global scaling placement are added in a first to-be-placed graph set, and the number of global scaling placements is r, r being positive integer. The process of global scaling placement includes:

enabling r=1, and determining a global scaling proportion corresponding to an $r^{th}$ global scaling placement;

globally scaling each graph in the first to-be-placed graph set according to the global scaling proportion corresponding to the $r^{th}$ global scaling placement;

placing each globally scaled graph in the first to-be-placed graph set to obtain a second placement result indicating that the first to-be-placed graph set is placed in the container;

determining a container filling rate corresponding to the second placement result; and enabling r=r+1 in response to r being less than a second preset value, and cyclically performing the process of the $r^{th}$ global scaling placement until r is greater than or equal to the second preset value.

In one embodiment, in response to the placement rule corresponding to the N graphs including a mixed scaling placement rule and the mixed scaling placement rule including an independent scaling placement rule and a global scaling placement rule, the placement unit 703, when placing the N graphs in the container according to the placement rule corresponding to the N graphs, performs the following steps:

performing independent scaling placement on the reference graph according to the independent scaling placement rule, and placing the reference graph in the container according to an independent scaling placement result; and performing global scaling placement on remaining graphs other than the reference graph in the N graphs according to the global scaling placement rule, and placing the remaining graphs in the container according to a global scaling placement result.

In one embodiment, in response to the placement rule corresponding to the N graphs being a global scaling placement rule, the placement unit 703, when placing the N graphs in the container according to the placement rule corresponding to the N graphs, performs the following steps:

performing global scaling placement on each graph in the N graphs according to the global scaling placement rule, and placing each graph in the N graphs in the container according to a global scaling placement result.

In one embodiment, the number of independent scaling placements is i, i being a positive integer. The process of performing independent scaling placement on the reference graph according to the independent scaling placement rule includes:

enabling i=1, and determining an independent scaling proportion corresponding to an $i^{th}$ independent scaling placement;

independently scaling the reference graph according to the independent scaling proportion corresponding to the $i^{th}$ independent scaling placement;

placing the independently scaled reference graph to obtain a first placement result indicating that the independently scaled reference graph is placed in the container;

determining a container filling rate corresponding to the first placement result; and enabling i=i+1 in response to i being less than a first preset value, and cyclically performing the process of the $i^{th}$ independent scaling placement until i is greater than or equal to the first preset value.

In one embodiment, the placement unit 703, when placing the reference graph in the container according to an independent scaling placement result, performs the following steps:

determining a first container filling rate from container filling rates corresponding to first placement results determined in all cycles, and obtaining an independent scaling proportion when the first container filling rate is obtained; and scaling the reference graph according to the obtained independent scaling proportion, and placing the scaled reference graph in the container according to the first placement result corresponding to the first container filling rate.

In one embodiment, the placement unit 703, when placing the remaining graphs in the container according to a global scaling placement result, performs the following steps:

determining a second container filling rate from container filling rates corresponding to second placement results determined in all cycles, and obtaining a global scaling proportion when the second container filling rate is obtained; and scaling the remaining graphs according to the obtained global scaling proportion, and placing the scaled remaining graphs in the container according to the second placement result corresponding to the second container filling rate.

In one embodiment, graphs required to be placed are added in a second to-be-placed graph set. The second to-be-placed graph set includes the independently scaled reference graph in the process of each independent scaling placement. Or, the second to-be-placed graph set includes the globally scaled graphs in the first to-be-placed graph set in the process of each global scaling placement. The placement unit 703, when placing the graphs in the second to-be-placed graph set to obtain a placement result indicating that the second to-be-placed graph set is placed in the container, performs the following steps:

grouping the second to-be-placed graph set according to a graphic area of each graph in the second to-be-placed graph set to obtain P graph groups arranged sequentially, P being a positive integer, each graph group including one or more graphs belonging to the second to-be-placed graph set, the graphic area of each graph in the top-ranked graph groups being greater than the graphic area of each graph in the bottom-ranked graph groups, and the graphs in each graph group being ranked in descending order of the graphic area;

placing each graph group to determine a placement result corresponding to each graph group; and combining the placement results corresponding to the graph groups into a placement result indicating that each graph in the second to-be-placed graph set is placed in the container.

In one embodiment, in response to the P graph groups including a graph group j, the graph group j including Mj graphs, and Mj being a positive integer, the placement unit 703, when placing the graph group j to determine a placement result corresponding to the graph group j, performs the following steps:

performing cross transformation on the graph group j to determine a population individual set corresponding to the graph group j, the population individual set including a plurality of candidate individuals, each candidate individual including Mj graphs arranged in an order, and the Mj graphs in the different candidate individuals being arranged in different orders;

placing the Mj graphs according to the arrangement order of the Mj graphs in each candidate individual to obtain a placement result corresponding to each candidate individual;

calculating an average placement center-of-gravity corresponding to each candidate individual according to the placement result corresponding to each candidate individual; and taking the placement result corresponding to the candidate individual with the average placement center-of-gravity satisfying a center-of-gravity condition as the placement result corresponding to the graph group j.

In one embodiment, the placement unit 703, when placing the Mj graphs according to the arrangement order of the Mj graphs in each candidate individual to obtain a placement result corresponding to each candidate individual, performs the following steps:

sequentially taking out each graph from any candidate individual in the plurality of candidate individuals, and calculating a candidate placement angle of each graph; and determining a placement position of each graph in the container based on a lowest center-of-gravity principle and the candidate placement angle of each graph, and placing each graph in the container according to the determined placement position to obtain the placement result corresponding to the candidate individual.

In one embodiment, in response to the N graphs including at least two identical symmetric graphs, the identical symmetric graphs are grouped in a same graph group, the identical symmetric graphs correspond to identical scaling proportions during scaling, and the identical symmetric graphs are gathered and placed during placement.

According to one embodiment of this application, the steps involved in the data processing method shown in FIG. 2 and FIG. 5 may be performed by the units in the data processing apparatus shown in FIG. 7. For example, step S202 and step S203 in FIG. 2 may be performed by the determination unit 702 in the data processing apparatus shown in FIG. 7, step S201 may be performed by the obtaining unit 701 in the data processing apparatus shown in FIG. 7, and step S204 may be performed by the placement unit 703 in the data processing apparatus shown in FIG. 7.

For another example, step S501 in FIG. 5 may be performed by the obtaining unit 701 in the data processing apparatus shown in FIG. 7, step S502 may be performed by the determination unit 702 in the data processing apparatus shown in FIG. 7, and step S503 and step S504 may be performed by the determination unit 702 and the placement unit 703 in the data processing apparatus shown in FIG. 7.

According to another embodiment of this application, the units in the data processing apparatus shown in FIG. 7 may be respectively or completely combined into one or more other units to constitute the apparatus, or some unit(s) therein may be further divided into a plurality of functionally smaller units, and the same operation may be realized without affecting the achievement of the technical effects of this embodiment of this application. The foregoing units are divided based on logical functions. In practice, a function of one unit may be realized by a plurality of units, or functions of a plurality of units are realized by one unit. In other embodiments of this application, the data processing apparatus may also include other units. In practice, the functions may also be realized with the aid of other units, and may be realized in cooperation by a plurality of units.

According to another embodiment of this application, the data processing apparatus shown in FIG. 7 may be constructed and the data processing method according to this embodiment of this application may be implemented by running computer-readable instructions (including program codes) capable of performing the steps of the corresponding method shown in FIG. 2 and FIG. 5 on processing elements and storage elements including a central processing unit (CPU), a random access memory (RAM), a read-only memory (ROM), and so on, for example, general computer devices of computers. The computer-readable instructions may be recorded in, for example, a computer-readable storage medium, may be loaded into a data processing device by using the computer-readable storage medium, and run in the data processing device.

In this embodiment of this application, when N graphs are required to be placed in a container, a reference graph is first determined from the N graphs based on a graphic attribute of each graph. Then a placement rule suitable for the N graphs is determined from at least one placement rule according to a relationship between a graphic attribute of the reference graph and an attribute threshold. Finally, the N graphs are placed in the container according to the determined placement rule. It is to be understood that N graphs are placed using a suitable placement rule, thereby implementing targeted placement processing and effectively improving a container filling rate.

Figure 8:
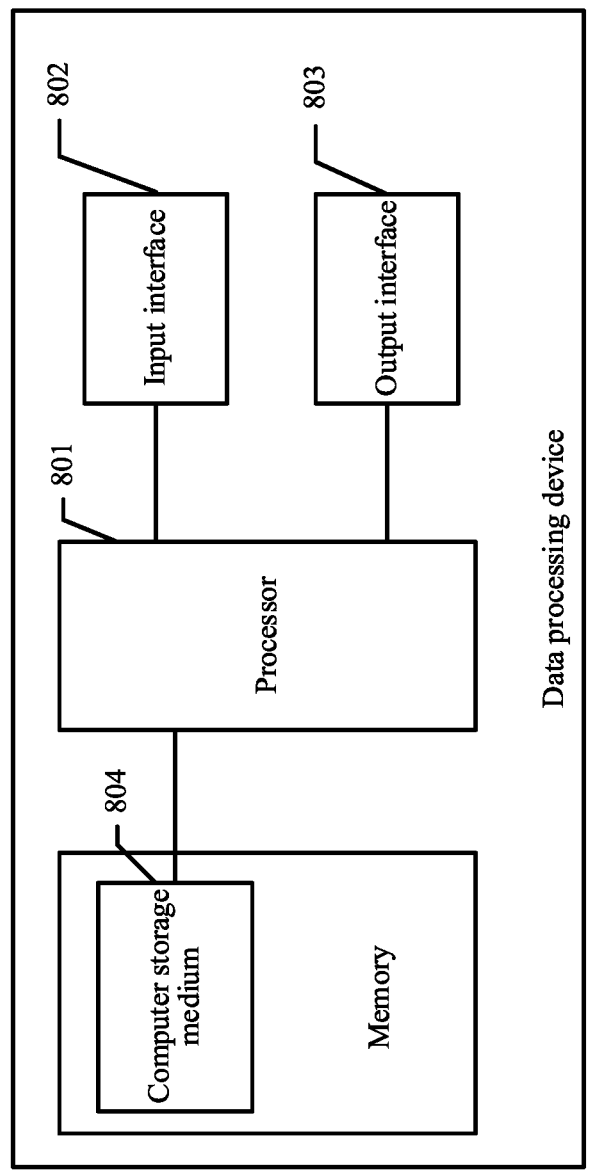
FIG. 8 is a schematic structural diagram of a data processing device according to an embodiment of this application.

FIG. 8 is a schematic structural diagram of a data processing device according to an embodiment of this application. The data processing device shown in FIG. 8 may include a processor 801, an input interface 802, an output interface 803, and a computer storage medium 804. The processor 801, the input interface 802, the output interface 803, and the computer storage medium 804 may be connected by a bus or in other manners.

The computer storage medium 804 may be stored in a memory of a message processing device. The computer storage medium 804 is configured to store computer-readable instructions. The processor 801 is configured to execute the computer-readable instructions stored in the computer storage medium 804. The processor 801 (or referred to as a CPU) is a computing core and a control core of the data processing device, is adapted to implement one or more computer-readable instructions, and is specifically loaded and adapted to:

obtain N graphs and a container for placing the N graphs, N being an integer greater than 2;

determine a reference graph from the N graphs based on a graphic attribute of each graph;

determine a placement rule corresponding to the N graphs from at least one placement rule according to a relationship between a graphic attribute of the reference graph and an attribute threshold; and place the N graphs in the container according to the placement rule corresponding to the N graphs.

In this embodiment of this application, when N graphs are required to be placed in a container, a reference graph is first determined from the N graphs based on a graphic attribute of each graph. Then a placement rule suitable for the N graphs is determined from at least one placement rule according to a relationship between a graphic attribute of the reference graph and an attribute threshold. Finally, the N graphs are placed in the container according to the determined placement rule. It is to be understood that N graphs are placed using a suitable placement rule, thereby implementing targeted placement processing and effectively improving a container filling rate.

This embodiment of this application also provides a memory. The memory is a memory device of a data processing device for storing programs and data. It is to be understood that the memory here may include an internal memory of the data processing device, and may also include an expanded memory supported by the data processing device. The memory provides a storage space. The storage space stores an operating system of the data processing device. Moreover, one or more computer-readable instructions loaded and executed by the processor 801 are also stored in the storage space. It is to be noted that the memory here may be a high-speed RAM, or a non-volatile memory, for example, at least one magnetic disk storage. In some embodiments, the memory may be at least one memory that is located far away from the foregoing processor.

In one embodiment, the one or more computer-readable instructions stored in the memory may be loaded and executed by the processor 801 to:

obtain N graphs and a container for placing the N graphs, N being an integer greater than 2;

determine a reference graph from the N graphs based on a graphic attribute of each graph;

determine a placement rule corresponding to the N graphs from at least one placement rule according to a relationship between a graphic attribute of the reference graph and an attribute threshold; and place the N graphs in the container according to the placement rule corresponding to the N graphs.

In one embodiment, the at least one placement rule includes a mixed scaling placement rule and a global scaling placement rule. The processor 801, when determining a placement rule corresponding to the N graphs from at least one placement rule according to a relationship between a graphic attribute of the reference graph and an attribute threshold, performs the following steps:

determining the mixed scaling placement rule as the placement rule corresponding to the N graphs in response to a first numerical relationship between the graphic attribute of the reference graph and the attribute threshold; and determining the global scaling placement rule as the placement rule corresponding to the N graphs in response to a second numerical relationship between the graphic attribute of the reference graph and the attribute threshold.

In one embodiment, the graphic attribute of each graph includes a graphic area of each graph. The processor 801, when determining a reference graph from the N graphs based on a graphic attribute of each graph, performs the following steps:

determining a total area of the N graphs based on the graphic area of each graph;

determining an area difference between the graphic area of each graph and the total area; and determining a first graph in the N graphs as the reference graph, the area difference between the graphic area of the first graph and the total area satisfying a first area difference threshold.

In one embodiment, the graphic attribute of each graph includes a graphic long-side length of each graph. The processor 801, when determining a reference graph from the N graphs based on a graphic attribute of each graph, performs the following steps:

determining a plurality of candidate graphs from the N graphs, the plurality of candidate graphs including N graphs; or, the plurality of candidate graphs including remaining graphs other than a first graph in the N graphs, the first graph referring to any graph in the N graphs in which an area difference between a graphic area of the graph and a total area of the N graphs satisfying a first area difference threshold;

determining a length difference between the graphic long-side length of each graph in the plurality of candidate graphs and a long-side length of the container; and determining a second graph in the plurality of candidate graphs as the reference graph, the length difference between the graphic long-side length of the second graph and the long-side length of the container satisfying a length difference threshold.

In one embodiment, the attribute threshold is determined based on the total area of the N graphs and a second area difference threshold. The processor 801 is further configured to:

determine a first numerical relationship between the graphic attribute of the reference graph and the attribute threshold in response to the graphic area of the reference graph being greater than the attribute threshold; and determine a second numerical relationship between the graphic attribute of the reference graph and the attribute threshold in response to the graphic area of the reference graph being less than or equal to the attribute threshold.

In one embodiment, in response to the at least one placement rule including a mixed scaling placement rule, remaining graphs other than the reference graph in the N graphs are required to be processed by global scaling placement. In response to the at least one placement rule including a global scaling placement rule, the N graphs are required to be processed by global scaling placement. The graphs required to be processed by global scaling placement are added in a first to-be-placed graph set, and the number of global scaling placements is r, r being positive integer. The process of global scaling placement includes:

enabling r=1, and determining a global scaling proportion corresponding to an $r^{th}$ global scaling placement;

globally scaling each graph in the first to-be-placed graph set according to the global scaling proportion corresponding to the $r^{th}$ global scaling placement;

placing each globally scaled graph in the first to-be-placed graph set to obtain a second placement result indicating that the first to-be-placed graph set is placed in the container;

determining a container filling rate corresponding to the second placement result; and enabling r=r+1 in response to r being less than a second preset value, and cyclically performing the process of the $r^{th}$ global scaling placement until r is greater than or equal to the second preset value.

In one embodiment, in response to the placement rule corresponding to the N graphs including a mixed scaling placement rule and the mixed scaling placement rule including an independent scaling placement rule and a global scaling placement rule, the processor 801, when placing the N graphs in the container according to the placement rule corresponding to the N graphs, performs the following steps:

performing independent scaling placement on the reference graph according to the independent scaling placement rule, and placing the reference graph in the container according to an independent scaling placement result; and performing global scaling placement on remaining graphs other than the reference graph in the N graphs according to the global scaling placement rule, and placing the remaining graphs in the container according to a global scaling placement result.

In one embodiment, in response to the placement rule corresponding to the N graphs being a global scaling placement rule, the processor 801, when placing the N graphs in the container according to the placement rule corresponding to the N graphs, performs the following steps:

performing global scaling placement on each graph in the N graphs according to the global scaling placement rule, and placing each graph in the N graphs in the container according to a global scaling placement result.

In one embodiment, the number of independent scaling placements is i, i being a positive integer. The process of performing independent scaling placement on the reference graph according to the independent scaling placement rule includes:

enabling i=1, and determining an independent scaling proportion corresponding to an $i^{th}$ independent scaling placement;

independently scaling the reference graph according to the independent scaling proportion corresponding to the $i^{th}$ independent scaling placement;

placing the independently scaled reference graph to obtain a first placement result indicating that the independently scaled reference graph is placed in the container;

determining a container filling rate corresponding to the first placement result; and enabling i=i+1 in response to i being less than a first preset value, and cyclically performing the process of the $i^{th}$ independent scaling placement until i is greater than or equal to the first preset value.

In one embodiment, the processor 801, when placing the reference graph in the container according to an independent scaling placement result, performs the following steps:

determining a first container filling rate from container filling rates corresponding to first placement results determined in all cycles, and obtaining an independent scaling proportion when the first container filling rate is obtained; and scaling the reference graph according to the obtained independent scaling proportion, and placing the scaled reference graph in the container according to the first placement result corresponding to the first container filling rate.

In one embodiment, the processor 801, when placing the remaining graphs in the container according to a global scaling placement result, performs the following steps:

determining a second container filling rate from container filling rates corresponding to second placement results determined in all cycles, and obtaining a global scaling proportion when the second container filling rate is obtained; and scaling the remaining graphs according to the obtained global scaling proportion, and placing the scaled remaining graphs in the container according to the second placement result corresponding to the second container filling rate.

In one embodiment, graphs required to be placed are added in a second to-be-placed graph set. The second to-be-placed graph set includes the independently scaled reference graph in the process of each independent scaling placement. Or, the second to-be-placed graph set includes the globally scaled graphs in the first to-be-placed graph set in the process of each global scaling placement. The processor 801, when placing the graphs in the second to-be-placed graph set to obtain a placement result indicating that the second to-be-placed graph set is placed in the container, performs the following steps:

grouping the second to-be-placed graph set according to a graphic area of each graph in the second to-be-placed graph set to obtain P graph groups arranged sequentially, P being a positive integer, each graph group including one or more graphs belonging to the second to-be-placed graph set, the graphic area of each graph in the top-ranked graph groups being greater than the graphic area of each graph in the bottom-ranked graph groups, and the graphs in each graph group being ranked in descending order of the graphic area;

placing each graph group to determine a placement result corresponding to each graph group; and combining the placement results corresponding to the graph groups into a placement result indicating that each graph in the second to-be-placed graph set is placed in the container.

In one embodiment, in response to the P graph groups including a graph group j, the graph group j including Mj graphs, and Mj being a positive integer, the processor 801, when placing the graph group j to determine a placement result corresponding to the graph group j, performs the following steps:

performing cross transformation on the graph group j to determine a population individual set corresponding to the graph group j, the population individual set including a plurality of candidate individuals, each candidate individual including Mj graphs arranged in an order, and the Mj graphs in the different candidate individuals being arranged in different orders;

placing the Mj graphs according to the arrangement order of the Mj graphs in each candidate individual to obtain a placement result corresponding to each candidate individual;

calculating an average placement center-of-gravity corresponding to each candidate individual according to the placement result corresponding to each candidate individual; and taking the placement result corresponding to the candidate individual with the average placement center-of-gravity satisfying a center-of-gravity condition as the placement result corresponding to the graph group j.

In one embodiment, the processor 801, when placing the Mj graphs according to the arrangement order of the Mj graphs in each candidate individual to obtain a placement result corresponding to each candidate individual, performs the following steps:

sequentially taking out each graph from any candidate individual in the plurality of candidate individuals, and calculating a candidate placement angle of each graph; and determining a placement position of each graph in the container based on a lowest center-of-gravity principle and the candidate placement angle of each graph, and placing each graph in the container according to the determined placement position to obtain the placement result corresponding to the candidate individual.

In one embodiment, in response to the N graphs including at least two identical symmetric graphs, the identical symmetric graphs are grouped in a same graph group, the identical symmetric graphs correspond to identical scaling proportions during scaling, and the identical symmetric graphs are gathered and placed during placement.

In this embodiment of this application, when N graphs are required to be placed in a container, a reference graph is first determined from the N graphs based on a graphic attribute of each graph. Then a placement rule suitable for the N graphs is determined from at least one placement rule according to a relationship between a graphic attribute of the reference graph and an attribute threshold. Finally, the N graphs are placed in the container according to the determined placement rule. It is to be understood that N graphs are placed using a suitable placement rule, thereby implementing targeted placement processing and effectively improving a container filling rate.

This embodiment of this application also provides a computer program product or a computer-readable instruction. The computer program product includes the computer-readable instruction. The computer-readable instruction is stored in a computer storage medium. The computer-readable instruction is loaded and executed by the processor 801 to:

obtain N graphs and a container for placing the N graphs, N being an integer greater than 2;

determine a reference graph from the N graphs based on a graphic attribute of each graph;

determine a placement rule corresponding to the N graphs from at least one placement rule according to a relationship between a graphic attribute of the reference graph and an attribute threshold; and place the N graphs in the container according to the placement rule corresponding to the N graphs.

In this embodiment of this application, when N graphs are required to be placed in a container, a reference graph is first determined from the N graphs based on a graphic attribute of each graph. Then a placement rule suitable for the N graphs is determined from at least one placement rule according to a relationship between a graphic attribute of the reference graph and an attribute threshold. Finally, the N graphs are placed in the container according to the determined placement rule. It is to be understood that N graphs are placed using a suitable placement rule, thereby implementing targeted placement processing and effectively improving a container filling rate.

In one embodiment, a data processing device is also provided, including a memory and a processor. The memory stores a computer-readable instruction. The processor, when executing the computer-readable instruction, implements the steps in the foregoing method embodiments.

In one embodiment, a computer-readable storage medium is provided. The computer-readable storage medium stores a computer-readable instruction. The computer-readable instruction, when executed by a processor, implements the steps in the foregoing method embodiments.

In one embodiment, a computer program product is provided. The computer program product includes a computer-readable instruction. The computer-readable instruction, when executed by a processor, implements the steps in the foregoing method embodiments.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more units or modules. Moreover, each unit or module can be part of an overall module that includes the functionalities of the unit or module.

What is claimed is:

1. A data processing method performed by a computer device, the method comprising:
   obtaining N graphs, N being an integer greater than 2;
   determining a reference graph from the N graphs based on a graphic attribute of each graph;
   determining a placement rule corresponding to the N graphs according to a relationship between a graphic attribute of the reference graph and an attribute threshold; and
   placing the N graphs in a container according to the placement rule.

2. The method according to claim 1, wherein the determining a placement rule corresponding to the N graphs according to a relationship between a graphic attribute of the reference graph and an attribute threshold comprises:
   determining a mixed scaling placement rule as the placement rule corresponding to the N graphs in response to a first numerical relationship between the graphic attribute of the reference graph and the attribute threshold; and
   determining a global scaling placement rule as the placement rule corresponding to the N graphs in response to a second numerical relationship between the graphic attribute of the reference graph and the attribute threshold.

3. The method according to claim 1, wherein the graphic attribute of each graph comprises a graphic area of the graph, and the determining a reference graph from the N graphs based on a graphic attribute of each graph comprises:
   determining a total area of the N graphs based on the graphic area of each graph;
   determining an area difference between the graphic area of each graph and the total area; and
   determining a first graph in the N graphs as the reference graph, wherein the area difference between the graphic area of the first graph and the total area satisfies a first area difference threshold.

4. The method according to claim 1, wherein the graphic attribute of each graph comprises a graphic long-side length of each graph, and the determining a reference graph from the N graphs based on a graphic attribute of each graph comprises:
   determining a plurality of candidate graphs from the N graphs;
   determining a length difference between a graphic long-side length of each graph in the plurality of candidate graphs and a long-side length of the container; and
   determining a second graph in the plurality of candidate graphs as the reference graph, wherein the length difference between the graphic long-side length of the second graph and the long-side length of the container satisfies a length difference threshold.

5. The method according to claim 1, wherein the placement rule corresponding to the N graphs comprises a mixed scaling placement rule and the mixed scaling placement rule comprises an independent scaling placement rule and a global scaling placement rule, the placing the N graphs in the container according to the placement rule corresponding to the N graphs comprises:
   performing independent scaling placement on the reference graph according to the independent scaling placement rule, and placing the reference graph in the container according to an independent scaling placement result;
   performing global scaling placement on remaining graphs other than the reference graph in the N graphs according to the global scaling placement rule; and
   placing the remaining graphs in the container according to a global scaling placement result.

6. The method according to claim 1, wherein the placement rule corresponding to the N graphs is a global scaling placement rule, the placing the N graphs in the container according to the placement rule corresponding to the N graphs comprises:
   performing global scaling placement on each graph in the N graphs according to the global scaling placement rule; and
   placing each graph in the N graphs in the container according to a global scaling placement result.

7. A computer device, comprising:
   a processor; and
   a computer storage medium, the computer storage medium storing one or more computer-readable instructions, the one or more computer-readable instructions being loaded and executed by the processor and causing the computer device to perform a data processing method including:
   obtaining N graphs, N being an integer greater than 2;
   determining a reference graph from the N graphs based on a graphic attribute of each graph;
   determining a placement rule corresponding to the N graphs according to a relationship between a graphic attribute of the reference graph and an attribute threshold; and
   placing the N graphs in a container according to the placement rule.

8. The computer device according to claim 7, wherein the determining a placement rule corresponding to the N graphs according to a relationship between a graphic attribute of the reference graph and an attribute threshold comprises:
   determining a mixed scaling placement rule as the placement rule corresponding to the N graphs in response to a first numerical relationship between the graphic attribute of the reference graph and the attribute threshold; and determining a global scaling placement rule as the placement rule corresponding to the N graphs in response to a second numerical relationship between the graphic attribute of the reference graph and the attribute threshold.

9. The computer device according to claim 7, wherein the graphic attribute of each graph comprises a graphic area of the graph, and the determining a reference graph from the N graphs based on a graphic attribute of each graph comprises:
determining a total area of the N graphs based on the graphic area of each graph;
determining an area difference between the graphic area of each graph and the total area; and
determining a first graph in the N graphs as the reference graph, wherein the area difference between the graphic area of the first graph and the total area satisfies a first area difference threshold.

10. The computer device according to claim 7, wherein the graphic attribute of each graph comprises a graphic long-side length of each graph, and the determining a reference graph from the N graphs based on a graphic attribute of each graph comprises:
determining a plurality of candidate graphs from the N graphs;
determining a length difference between a graphic long-side length of each graph in the plurality of candidate graphs and a long-side length of the container; and
determining a second graph in the plurality of candidate graphs as the reference graph, wherein the length difference between the graphic long-side length of the second graph and the long-side length of the container satisfies a length difference threshold.

11. The computer device according to claim 7, wherein the placement rule corresponding to the N graphs comprises a mixed scaling placement rule and the mixed scaling placement rule comprises an independent scaling placement rule and a global scaling placement rule, the placing the N graphs in the container according to the placement rule corresponding to the N graphs comprises:
performing independent scaling placement on the reference graph according to the independent scaling placement rule, and placing the reference graph in the container according to an independent scaling placement result;
performing global scaling placement on remaining graphs other than the reference graph in the N graphs according to the global scaling placement rule; and
placing the remaining graphs in the container according to a global scaling placement result.

12. The computer device according to claim 7, wherein the placement rule corresponding to the N graphs is a global scaling placement rule, the placing the N graphs in the container according to the placement rule corresponding to the N graphs comprises:
performing global scaling placement on each graph in the N graphs according to the global scaling placement rule; and
placing each graph in the N graphs in the container according to a global scaling placement result.

13. A non-transitory computer storage medium, storing one or more computer-readable instructions, and the one or more computer-readable instructions being loaded and executed by a processor of a computer device and causing the computer device to perform a data processing method including:
obtaining N graphs, N being an integer greater than 2;
determining a reference graph from the N graphs based on a graphic attribute of each graph;
determining a placement rule corresponding to the N graphs according to a relationship between a graphic attribute of the reference graph and an attribute threshold; and
placing the N graphs in a container according to the placement rule.

14. The non-transitory computer storage medium according to claim 13, wherein the determining a placement rule corresponding to the N graphs according to a relationship between a graphic attribute of the reference graph and an attribute threshold comprises:
determining a mixed scaling placement rule as the placement rule corresponding to the N graphs in response to a first numerical relationship between the graphic attribute of the reference graph and the attribute threshold; and
determining a global scaling placement rule as the placement rule corresponding to the N graphs in response to a second numerical relationship between the graphic attribute of the reference graph and the attribute threshold.

15. The non-transitory computer storage medium according to claim 13, wherein the graphic attribute of each graph comprises a graphic area of the graph, and the determining a reference graph from the N graphs based on a graphic attribute of each graph comprises:
determining a total area of the N graphs based on the graphic area of each graph;
determining an area difference between the graphic area of each graph and the total area; and
determining a first graph in the N graphs as the reference graph, wherein the area difference between the graphic area of the first graph and the total area satisfies a first area difference threshold.

16. The non-transitory computer storage medium according to claim 13, wherein the graphic attribute of each graph comprises a graphic long-side length of each graph, and the determining a reference graph from the N graphs based on a graphic attribute of each graph comprises:
determining a plurality of candidate graphs from the N graphs;
determining a length difference between a graphic long-side length of each graph in the plurality of candidate graphs and a long-side length of the container; and
determining a second graph in the plurality of candidate graphs as the reference graph, wherein the length difference between the graphic long-side length of the second graph and the long-side length of the container satisfies a length difference threshold.

17. The non-transitory computer storage medium according to claim 13, wherein the placement rule corresponding to the N graphs comprises a mixed scaling placement rule and the mixed scaling placement rule comprises an independent scaling placement rule and a global scaling placement rule, the placing the N graphs in the container according to the placement rule corresponding to the N graphs comprises:
performing independent scaling placement on the reference graph according to the independent scaling placement rule, and placing the reference graph in the container according to an independent scaling placement result;
performing global scaling placement on remaining graphs other than the reference graph in the N graphs according to the global scaling placement rule; and placing the remaining graphs in the container according to a global scaling placement result.

18. The non-transitory computer storage medium according to claim 13, wherein the placement rule corresponding to the N graphs is a global scaling placement rule, the placing the N graphs in the container according to the placement rule corresponding to the N graphs comprises:

performing global scaling placement on each graph in the N graphs according to the global scaling placement rule; and placing each graph in the N graphs in the container according to a global scaling placement result.

* * * * *